United States Patent
Hashimoto et al.

(10) Patent No.: US 10,479,271 B2
(45) Date of Patent: Nov. 19, 2019

(54) VEHICLE NOTIFICATION DEVICE AND VEHICLE NOTIFICATION METHOD

(71) Applicant: CLARION CO., LTD., Saitama-shi (JP)

(72) Inventors: Takeshi Hashimoto, Motomiya (JP); Kenji Kono, Tokyo (JP); Yasuhiro Fujita, Kashiwa (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 15/777,915

(22) PCT Filed: Oct. 24, 2016

(86) PCT No.: PCT/JP2016/081388
§ 371 (c)(1),
(2) Date: May 22, 2018

(87) PCT Pub. No.: WO2017/090355
PCT Pub. Date: Jun. 1, 2017

(65) Prior Publication Data
US 2018/0326902 A1 Nov. 15, 2018

(30) Foreign Application Priority Data
Nov. 27, 2015 (JP) .................. 2015-231272

(51) Int. Cl.
*B60Q 9/00* (2006.01)
*B60N 2/90* (2018.01)
(Continued)

(52) U.S. Cl.
CPC .................. *B60Q 9/00* (2013.01); *A47C 7/74* (2013.01); *B60N 2/90* (2018.02); *B60R 11/02* (2013.01);
(Continued)

(58) Field of Classification Search
None
See application file for complete search history.

(56) References Cited

U.S. PATENT DOCUMENTS

| | | | |
|---|---|---|---|
| 9,886,829 B2 * | 2/2018 | Levesque | G08B 6/00 |
| 2007/0109104 A1 * | 5/2007 | Altan | B60Q 9/008 340/407.1 |

(Continued)

FOREIGN PATENT DOCUMENTS

| | | |
|---|---|---|
| JP | 2007-55321 | 3/2007 |
| JP | 2007-65038 | 3/2007 |

(Continued)

OTHER PUBLICATIONS

International Search Report for corresponding International Application No. PCT/JP2016/081388, dated Jan. 24, 2017.

(Continued)

*Primary Examiner* — Chico A Foxx
(74) *Attorney, Agent, or Firm* — Mori & Ward, LLP

(57) ABSTRACT

To allow the driver to identify a notification vibration even in a situation in which the notification vibration may be masked depending on the road conditions. A vehicle notification device (1) randomly extract one of a plurality of pieces of signal data by the number of vibrators (exciters EX1 to EX4), each of the pieces of signal data being different in a combination of an initial frequency and a target frequency and generates a plurality of sweep signals by changing the frequency from the initial frequency to the target frequency of the extracted piece of signal data in cycles. A plurality of notification vibrations whose frequencies change in different frequency ranges are outputted by outputting the generated sweep signals, individually from the vibrators (exciters EX1 to EX4).

8 Claims, 15 Drawing Sheets

(51) Int. Cl.
*A47C 7/74* (2006.01)
*B60R 11/02* (2006.01)
*B60R 21/00* (2006.01)
*G08B 21/00* (2006.01)
*G08G 1/16* (2006.01)
*H04R 1/00* (2006.01)
*H04R 3/00* (2006.01)

(52) U.S. Cl.
CPC ............ *B60R 21/00* (2013.01); *G08B 21/00* (2013.01); *G08G 1/16* (2013.01); *H04R 1/00* (2013.01); *H04R 3/00* (2013.01); *B60N 2002/981* (2018.02)

(56) References Cited

U.S. PATENT DOCUMENTS

| | | | | |
|---|---|---|---|---|
| 2007/0241595 | A1* | 10/2007 | Nathan | B06B 3/00 297/217.3 |
| 2008/0129094 | A1* | 6/2008 | Nakajima | A61H 23/0236 297/217.4 |
| 2009/0099721 | A1 | 4/2009 | Imai et al. | |
| 2009/0224630 | A1* | 9/2009 | Adachi | H02N 2/008 310/317 |
| 2011/0018740 | A1* | 1/2011 | Boren | G08B 6/00 340/965 |
| 2011/0273966 | A1* | 11/2011 | Coste | G01V 1/155 367/189 |
| 2012/0226418 | A1* | 9/2012 | Veen | B60N 2/0232 701/49 |
| 2012/0242465 | A1 | 9/2012 | Murata et al. | |
| 2013/0044000 | A1 | 2/2013 | Nakai et al. | |
| 2013/0341977 | A1* | 12/2013 | Kiefer | B60N 2/976 297/217.3 |
| 2013/0342366 | A1* | 12/2013 | Kiefer | G08B 6/00 340/901 |
| 2014/0346823 | A1* | 11/2014 | Stebbins | B60Q 9/008 297/217.1 |
| 2015/0175172 | A1* | 6/2015 | Truong | B60W 50/10 701/36 |
| 2015/0198448 | A1* | 7/2015 | Sanma | G08G 1/166 701/400 |
| 2016/0150313 | A1* | 5/2016 | Howard | H04R 1/2803 381/71.4 |
| 2017/0313246 | A1* | 11/2017 | Chen | B60Q 1/525 |
| 2018/0005528 | A1* | 1/2018 | Loeillet | G08G 1/165 |
| 2018/0170229 | A1* | 6/2018 | Hashimoto | B60N 2/90 |

FOREIGN PATENT DOCUMENTS

| | | | | |
|---|---|---|---|---|
| JP | 2008-72165 | | 3/2008 | |
| JP | 2008-077631 | | 4/2008 | |
| JP | 2008-129716 | | 6/2008 | |
| JP | 2009-031946 | | 2/2009 | |
| KR | 20120038259 A | * | 4/2012 | ............ H02P 25/06 |
| WO | WO 2007/023624 | | 3/2007 | |
| WO | WO 2011/071044 | | 6/2011 | |
| WO | WO 2011/138855 | | 11/2011 | |

OTHER PUBLICATIONS

Written Opinion for corresponding International Application No. PCT/JP2016/081388, dated Jan. 24, 2017.
Extended European Search Report for corresponding EP Application No. 16868304.3-1010, dated Jun. 17, 2019.

\* cited by examiner

|  | INITIAL FREQUENCY (Hz) | TARGET FREQUENCY (Hz) |
|---|---|---|
| SIGNAL 1 | 40 | 60 |
| SIGNAL 2 | 50 | 70 |
| SIGNAL 3 | 60 | 80 |
| SIGNAL 4 | 70 | 90 |
| SIGNAL 5 | 80 | 100 |
| SIGNAL 6 | 90 | 110 |
| SIGNAL 7 | 100 | 120 |
| SIGNAL 8 | 110 | 130 |

*FIG. 5*

VEHICLE NOTIFICATION DEVICE AND VEHICLE NOTIFICATION METHOD

TECHNICAL FIELD

The present invention relates to a vehicle notification device, vehicle notification method, and notification signals and, more specifically, to a vehicle notification device, vehicle notification method, and notification signals that are able to notify the user through vibrations.

BACKGROUND ART

There have been known audio systems including speakers installed in a vehicle seat (for example, see Patent Literatures 1 and 2). Such an audio system includes a full-range speaker installed near the headrest of the seat and subwoofers installed in the backrest or seat surface of the seat and is able to output sounds in a low-to-high wide frequency range. The subwoofers are embedded in the seat and configured to vibrate the seat in accordance with the level of a low-frequency-band music signal. When a sound outputted from the full-range speaker installed near the headrest and vibrations outputted from the subwoofers are combined together, the realism can be enhanced.

Subwoofers are not used solely to enhance the realism of music by outputting deep bass (low-frequency sounds). They have been also used recently as means for notifying the driver (alarm means).

For example, there have been proposed vehicle notification devices that when the vehicle crosses a lane marking, notify the driver that the vehicle has crossed the lane marking through vibrations, as well as notify the driver of the position of the crossed lane marking using the vibration position of the seat (for example, see Patent Literature 3). There has been also proposed a vehicle notification device determines whether the driver is dozing by detecting the heart rate of the driver using a heart rate monitor and awakens the driver by vibrating a vibrator (exciter) disposed in a seat (see Patent Literature 4).

As seen above, an alarm or notification can be issued to the driver by vibrating a vibrator (subwoofer, etc.) disposed in the driver's seat when necessary. There have been also proposed many other methods of notifying the driver by vibrating speakers or the like installed in the driver's seat.

CITATION LIST

Patent Literature

PTL 1: Japanese Unexamined Patent Application Publication No. 2007-65038
PTL 2: Japanese Unexamined Patent Application Publication No. 2008-72165
PTL 3: Japanese Unexamined Patent Application Publication No. 2008-129716
PTL 4: Japanese Unexamined Patent Application Publication No. 2007-55321

SUMMARY OF INVENTION

Technical Problem

Typical examples of speakers embedded in the seat include dynamic speakers using cone paper or the like and exciters that output a sound or vibration by vibrating the contact surface. Examples of a sound source that vibrates a speaker include sinusoidal signals and sweep signals. As used herein, the term "sweep signal" refers to a signal obtained by gradually changing the frequency of an output sound.

No matter what type of speaker is embedded in the seat, the vibration component of a low-frequency sound or low-frequency vibration tends to significantly decrease on the seat surface. For this reason, a notification device including speakers embedded in the seat needs to output high-level sound signals so that the user can reliably feel vibrations.

On the other hand, if signals having higher levels than an allowable input level are inputted to a dynamic speaker or exciter, the voice coil would disadvantageously burn out. In particular, if uniform-level signals (signals whose level or amplitude is constant), such as sinusoidal signals or sweep signals, are continuously inputted to a speaker or the like, an overcurrent may occur. Such an overcurrent may burn out the voice coil of the speaker or the like even if the levels of the inputted signals fall within the allowable input level.

Also, while the vehicle travels, a steady-state traveling vibration is transmitted to the seat depending on the road conditions and thus the seat may cause a low-frequency vibration. The frequency band of such a low-frequency seat vibration may be the same as that of a low-frequency alarm vibration from the speaker or exciter, disadvantageously making it difficult for the driver to distinguish between the vehicle vibration and the alarm vibration.

If the alarm vibration is masked by the vehicle vibration and the driver has difficulty in distinguishing the alarm vibration from the vehicle vibration, it is considered to use a method of making the frequency band of the alarm signal different from the frequency band of the vehicle vibration by intentionally increasing the frequency of the alarm signal. However, if the frequency band of the alarm signal is increased, the propagation mode (vibration transmission characteristics) of the seat changes with respect to the low-band alarm signal. The change in the propagation mode tends to reduce the vibration component of the alarm signal and thus the alarm signal tends to be outputted as a sound component. The alarm vibration outputted as a sound propagates through the space. As a result, the alarm sound is transmitted to a passenger other than the driver, unfavorably making the passenger anxious.

The present invention has been made in view of the above problem, and an object thereof is to provide a vehicle notification device, vehicle notification method, and notification signals that when an alarm vibration is outputted from a speaker, exciter, or the like disposed in a seat, allow the driver to reliably distinguish the alarm signal even in a situation in which the alarm vibration may be masked depending on the road conditions.

Another object of the present invention is to provide a vehicle notification device, vehicle notification method, and notification signals that when an alarm vibration is outputted from a vibration device such as a speaker or exciter disposed in a seat, are able to prevent burn-out of the vibration device.

Solution to Problem

To solve the above problem, a vehicle notification device according to one aspect of the present invention includes a plurality of vibrators independently disposed in a seat, a storage unit configured to store a plurality of pieces of signal data that are different in a combination of an initial frequency and a target frequency, and a signal generator configured to randomly extract one of the pieces of signal data stored in the storage unit by the number of the vibrators and to generate a plurality of sweep signals corresponding to the number of the vibrators, each of the sweep signals being generated by changing a frequency from the initial frequency to the target frequency of the extracted piece of signal data in cycles. A plurality of notification vibrations whose frequencies change in different frequency ranges are outputted from a plurality of positions of the seat by outputting the sweep signals generated by the signal generator, individually from the vibrators.

Further, a vehicle notification method according to another aspect of the present invention performed by a vehicle notification device that outputs notification vibrations from a plurality of vibrators independently disposed in a seat. The method includes a sweep signal generation step of randomly extracting, by a signal generator, one of a plurality of pieces of signal data stored in a storage unit by the number of the vibrators, the pieces of signal data being different in a combination of an initial frequency and a target frequency, and generating a plurality of sweep signals corresponding to the number of the vibrators, each of the sweep signals being generated by changing a frequency from the initial frequency to the target frequency of the extracted piece of signal data in cycles, and a vibration output step of outputting a plurality of notification vibrations whose frequencies change in different frequency ranges, from a plurality of positions of the seat by outputting the sweep signals generated in the sweep signal generation step, individually from the vibrators.

Notification signals of a vehicle notification device according to yet another aspect of the present invention inputted to a plurality of vibrators independently disposed in a seat so that notification vibrations are outputted from the vibrators. The notification signals are sweep signals whose frequency components are swept by randomly extracting one of a plurality of pieces of signal data, the pieces of signal data being different in a combination of an initial frequency and a target frequency, and changing frequencies from the initial frequency to the target frequency of the extracted piece of signal data in cycles.

The vehicle notification device, vehicle notification method, and notification signals described above are able to generate sweep signals having different frequency ranges on the basis of a randomly extracted combination of an initial frequency and a target frequency of multiple combinations of initial frequencies and target frequencies and to output the different sweep signals from the multiple vibrators. Since the wavelengths of the sweep signals are changed in each cycle by changing the initial frequency and target frequency of the sweep signals, notification vibrations having various frequency components can be outputted from the respective positions of the seat.

In particular, the multiple vibrators are disposed in the seat, notification vibrations having different frequency components can be outputted individually from the vibrators. Thus, the recognizability and distinguishability of notification vibrations by the driver can be improved. Also, the attention of the driver to notification vibrations can be increased significantly. Even in a situation in which alarm vibrations may be masked by a steady-state vibration transmitted from the road surface to the seat depending on the road conditions while the vehicle travels, it is possible to improve the recognizability and distinguishability of notification vibrations by the driver and to significantly increase the attention of the driver to notification vibrations.

The vehicle notification device described above further includes a delay signal generator configured to, by continuously randomly extracting one time value from a time range of each of the cycles as a delay time value, generate a plurality of delay signals indicating change states of the delay time values, and a variable delay unit configured to delay the sweep signals generated by the signal generator in each of the cycles on the basis of the change states of the delay time values in the delay signals.

The vehicle notification method described above further includes a delay signal generation step of, by continuously randomly extracting one time value from a time range of each of the cycles as a delay time value, generating, by a delay signal generator, a plurality of delay signals indicating change states of the delay time values, and a variable delay step of delaying, by a variable delay unit, the sweep signals generated in the sweep signal generation step in each of the cycles on the basis of the change states of the delay time values in the delay signals generated in the delay signal generation step.

In the notification signals described above, by continuously randomly extracting one time value from a time range of each of the cycles as a delay time value, change states of the delay time values are obtained, and timings when the sweep signals are outputted from the vibrators are delayed in each of the cycles on the basis of the obtained change states of the delay time values.

Further, the vehicle notification device, vehicle notification method, and notification signals are able to delay multiple sweep signals in each cycle on the basis of the change states of the delay time values in the multiple delay signals. Thus, the timings when notification vibrations are outputted from the multiple vibrators can be changed. As a result, it is possible to improve the recognizability and distinguishability of notification vibrations by the driver and to significantly increase the attention of the driver to notification vibrations.

Also, the timings when notification vibrations are outputted from the multiple vibrators can be changed. Thus, even in a situation in which alarm vibrations may be masked by a steady-state vibration transmitted from the road surface to the seat depending on the road conditions while the vehicle travels, it is possible to improve the recognizability and distinguishability of notification vibrations by the driver and to significantly increase the attention of the driver to notification vibrations.

In the vehicle notification device described above further includes at least one of an amplitude changer configured to randomly change amplitude values of the sweep signals generated by the signal generator in each of the cycles, and an occurrence frequency controller configured to suppress occurrence of the notification vibrations in each of the cycles by randomly limiting the amplitude values of the sweep signals generated by the signal generator to zero in each of the cycles.

In the vehicle notification method described above further includes at least one of an amplitude change step of randomly changing, by an amplitude changer, amplitude values of the sweep signals generated in the sweep signal generation step in each of the cycles, and an occurrence frequency control step of suppressing, by an occurrence frequency controller, occurrence of the notification vibrations in each of the cycles by randomly limiting the amplitude values of the sweep signals generated in the sweep signal generation step to zero in each of the cycles.

In the notification signals described above, at least one of processes is performed. The processes include a process of randomly changing amplitude values of the sweep signals in each of the cycles and a process of suppressing occurrence of the notification vibrations in each of the cycles by randomly limiting the amplitude values of the sweep signals to zero in each of the cycles.

Also, the vehicle notification device, vehicle notification method, and notification signals randomly change the amplitude values of the cycles of the sweep signals, or randomly limit the amplitude values of the cycles of the sweep signals to zero and thus are able to suppress occurrence of a notification vibration in one cycle. That is, the vehicle notification device, vehicle notification method, and notification signals are able to change notification vibrations outputted from the vibrators to different amplitude values corresponding to the vibrators or to randomly suppress occurrence of a notification vibration in one cycle. Thus, it is possible to improve the recognizability and distinguishability of notification vibrations by the driver and to significantly increase attention of the driver to notification vibrations. Also, even in a situation in which alarm vibrations may be masked by a steady-state vibration transmitted from the road surface to the seat depending on the road conditions while the vehicle travels, it is possible to improve the recognizability and distinguishability of notification vibrations by the driver and to significantly increase the attention of the driver to notification vibrations.

In the vehicle notification device described above, when changing frequencies of the sweep signals from the initial frequency to the target frequency, the signal generator changes amplitude values in accordance with changes in the frequencies.

In the vehicle notification method described above, the sweep signal generation step includes when changing frequencies of the sweep signals from the initial frequency to the target frequency, changing, by the signal generator, amplitude values in accordance with changes in the frequencies.

In the notification signals described above, when changing frequencies of the sweep signals from the initial frequency to the target frequency, amplitude values are changed in accordance with changes in the frequencies.

Also, when the frequencies of the sweep signals are changed from the initial frequency to the target frequency, the vehicle notification device, vehicle notification method, and notification signals are able to change the amplitude values in accordance with changes in the frequencies. For example, the vehicle notification device and the like are able to gradually increase the amplitude values of the sweep signals from the initial frequency, to maximize the amplitude values at one of frequencies from the initial frequency to the target frequency, and to gradually reduce the amplitude values of the sweep signals from the one frequency toward the target frequency. As seen above, the amplitude values in one cycle of the sweep signals can be changed by changing the amplitudes in accordance with changes in the frequencies.

By changing the amplitude value in one cycle of one sweep signal, continuous input of signals having a uniform amplitude value (signal level) to the vibrators can be prevented. Thus, burn-out of the vibrators due to an overcurrent can be prevented, extending the lives of the vibrators. Also, by changing the amplitude value in one cycle of one sweep signal, the power consumption of the vibrators can be reduced.

Advantageous Effects of Invention

The vehicle notification device, vehicle notification method, and notification signals of an embodiment of the present invention are able to generate sweep signals having different frequency ranges on the basis of a randomly extracted combination of an initial frequency and a target frequency of multiple combinations of initial frequencies and target frequencies and to output the different sweep signals from the multiple vibrators. Since the wavelengths of the sweep signals are changed in each cycle by changing the initial frequency and target frequency of the sweep signals, notification vibrations having various frequency components can be outputted from the respective positions of the seat.

In particular, the multiple vibrators are disposed in the seat, notification vibrations having different frequency components can be outputted individually from the vibrators. Thus, the recognizability and distinguishability of notification vibrations by the driver can be improved. Also, the attention of the driver to notification vibrations can be increased significantly. Even in a situation in which alarm vibrations may be masked by a steady-state vibration transmitted from the road surface to the seat depending on the road conditions while the vehicle travels, it is possible to improve the recognizability and distinguishability of notification vibrations by the driver and to significantly increase the attention of the driver to notification vibrations.

BRIEF DESCRIPTION OF DRAWINGS

FIG. 5 is a table showing an example of combinations of initial frequencies and target frequencies of eight sweep signals (signals 1 to 8).

DESCRIPTION OF EMBODIMENTS

Figure 1:
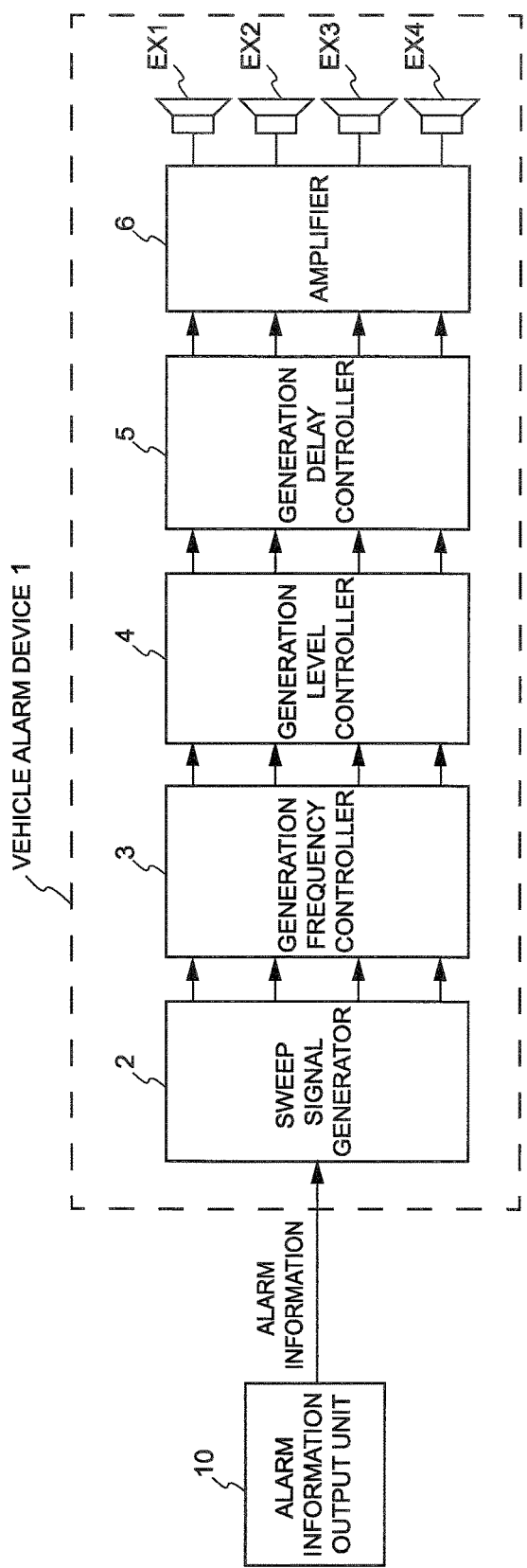
FIG. 1 is a block diagram showing a schematic configuration of a vehicle alarm device according to an embodiment.

Now, a vehicle alarm device will be described in detail as an example of a vehicle notification device according to the present invention with reference to the drawings. FIG. 1 is a block diagram showing a schematic configuration of a vehicle alarm device according to an embodiment. A vehicle alarm device (vehicle notification device) 1 includes a sweep signal generator 2, a generation frequency controller (occurrence frequency controller) 3, a generation level controller (amplitude changer) 4, a generation delay controller 5, an amplifier 6, and four exciters (vibrators) EX1, EX2, EX3, and EX4.

Connected to the sweep signal generator 2 is an alarm information output unit 10 that generates alarm information serving as a determination criterion on whether to cause the exciters EX1 to EX4 to generate alarm vibrations. The alarm information output unit 10 generates alarm information based on such as a lane departure signal, vehicle approach information, doze detection information, and a sharp curve signal and outputs the generated information to the sweep signal generator 2. The alarm information output unit 10 detects these alarming matters using a typical method such as a method of capturing images of the front of the vehicle and analyzing the images or a method of detecting an alarming matter by radiating a radar wave forward and measuring a reflected wave.

[Exciter]

The exciters EX1 to EX4 serve as vibration devices that caution the driver by individually outputting vibrations and sounds for notification. In the embodiment, a case in which exciters are used as vibration devices will be described. However, the vibration devices need not be exciters and may be another type of devices such as dynamic speakers. As used herein, the term "exciter" refers to an output device that is able to transmit a vibration force from the voice coil thereof to an object in contact with the exciter and to cause the object to output a vibration or sound as a diaphragm.

Figure 2:
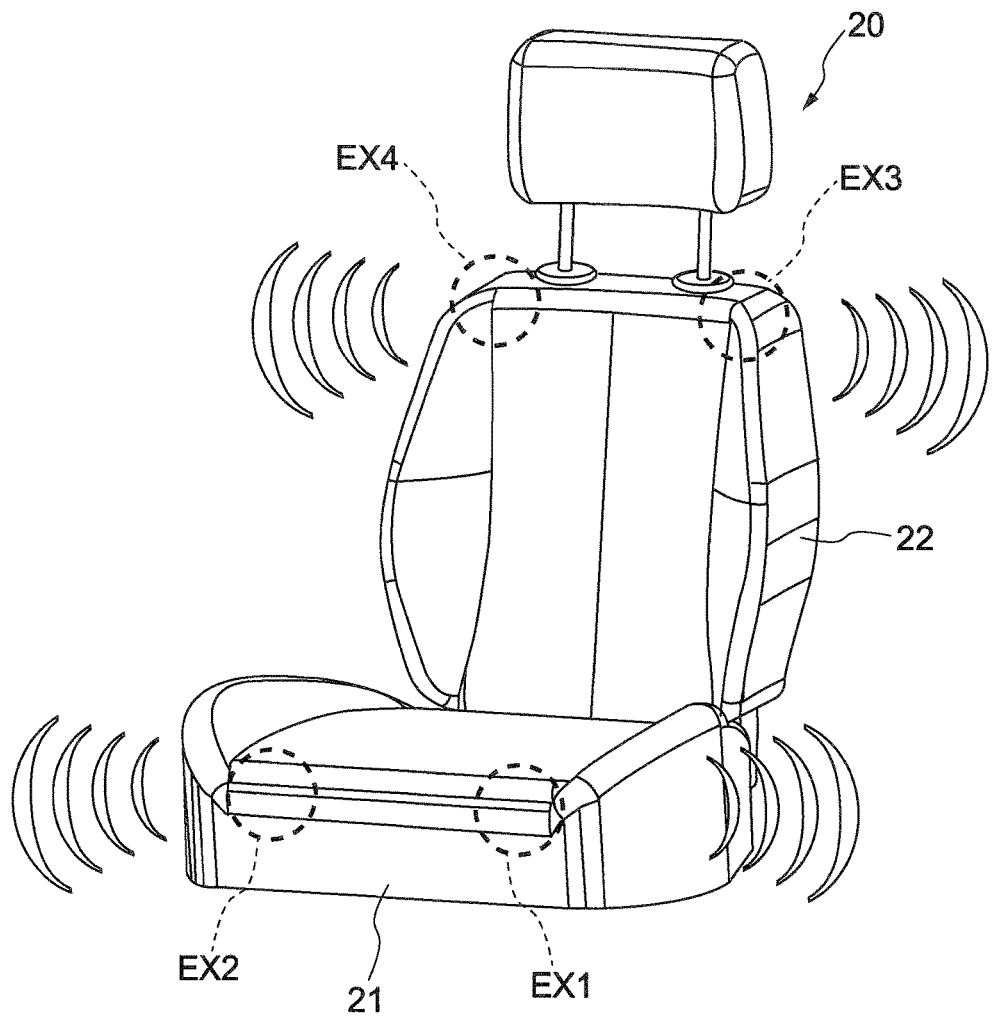
FIG. 2 is a drawing schematically showing a state in which exciters EX1 to EX4 according to the embodiment are installed in a driver's seat.

FIG. 2 is a drawing schematically showing a state in which the exciters EX1 to EX4 are installed in a driver's seat (seat) 20 of a vehicle. As shown in FIG. 2, the exciter EX1 is installed in a front-left portion of a seat surface 21 of the driver's seat 20; the exciter EX2 is installed in a front-right portion of the seat surface 21; the exciter EX3 is installed in an upper-left portion of a backrest 22 of the driver's seat 20; and the exciter EX4 is installed in an upper-right portion of the backrest 22. The exciters EX1 to EX4 are installed in a cushion that is the interior member of the seat surface 21 and backrest 22.

Note that the exciters EX1 to EX4 need not be installed in positions shown in FIG. 2 and may be installed in any positions as long as the positions are positions in which the driver can distinguish the vibrations of the exciters EX1 to EX4 through his or her body portions while driving the vehicle. For this reason, the installation positions of the exciters EX1 to EX4 can be changed flexibly. For example, the exciters EX3 and EX4 need not be installed in the upper left and right positions of the backrest 22 and may be installed, for example, in lower left and right positions of the backrest 22. Or, the exciter EX3 and exciter EX4 may be installed in rear left and right positions of the seat surface 21. Also, the number of exciters need not be four and may be more than four or less than four.

[Sweep Signal Generator]

Figure 3:
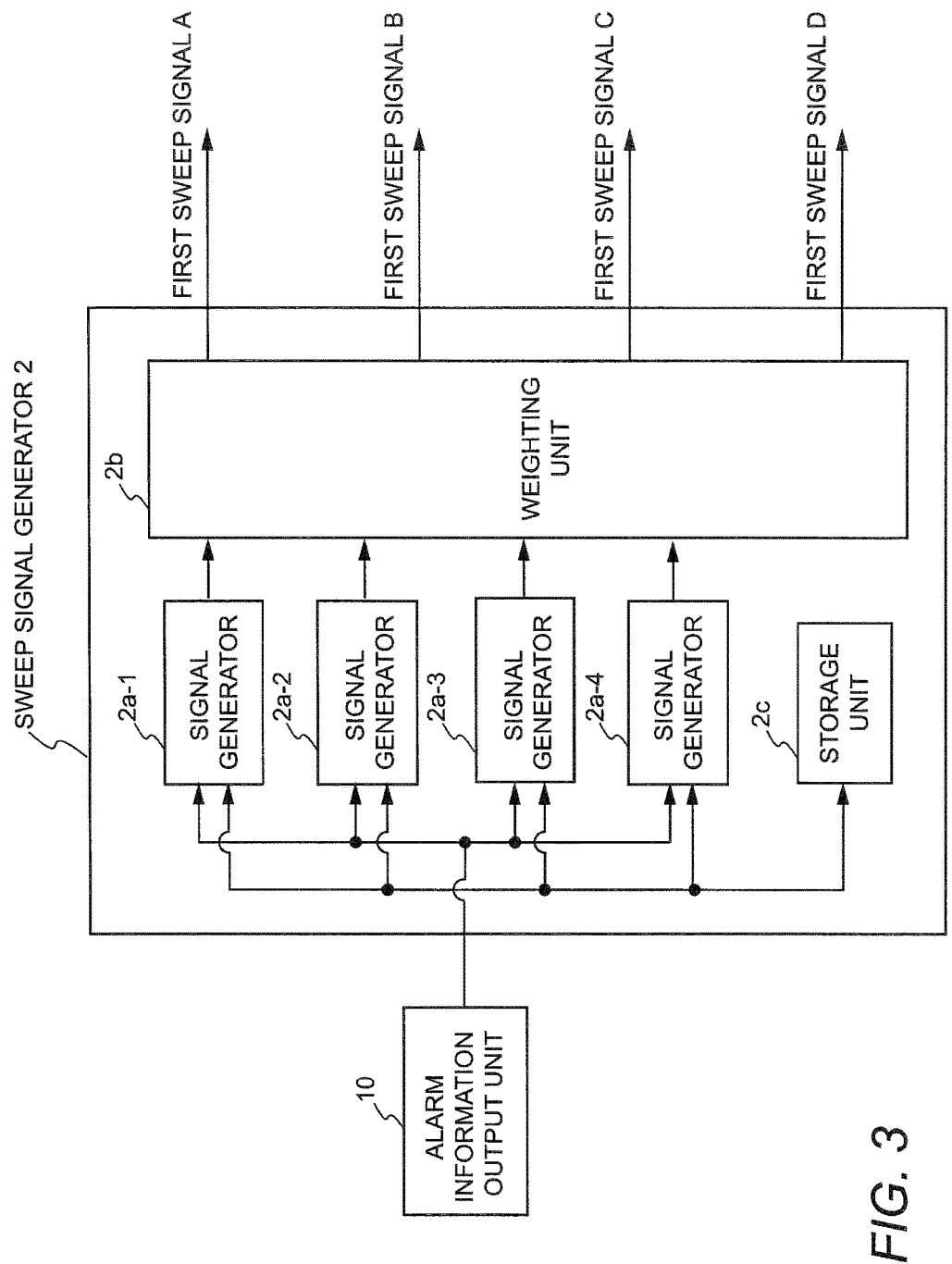
FIG. 3 is a block diagram showing a schematic configuration of a sweep signal generator according to the embodiment.

The sweep signal generator 2 has a function of, when receiving alarm information from the alarm information output unit 10, generating alarm sweep signals on the basis of the alarm information. FIG. 3 is a block diagram showing a schematic configuration of the sweep signal generator 2. As shown in FIG. 3, the sweep signal generator 2 includes four signal generators 2a, (2a-1, 2a-2, 2a-3, and 2a-4), a weighting unit 2b, and a storage unit 2c. The four signal generators 2a are disposed so as to correspond to the four exciters, EX1 to EX4. The signal generators 2a, (2a-1 to 2a-4) generate sweep signals on the basis of alarm information received from the alarm information output unit 10.

While receiving alarm information from the alarm information output unit 10, the sweep signal generator 2 continuously generates sweep signals using the signal generators 2a and weighting unit 2b and continuously outputs the sweep signals to the generation frequency controller 3. Note that the sweep signal generator 2 generates sweep signals to be inputted to the exciters EX1 to EX4 (four sweep signals) and outputs the sweep signals to the generation frequency controller 3.

Each signal generator 2a generates a sweep signal consisting of a sine wave. Specifically, each signal generator 2a generates a sweep signal by sweeping the frequency of the sine wave in a low frequency band. If the exciters are vibrated using sweep signals corresponding to the entire frequency band, the vibration characteristics (vibration propagation mode) of the driver's seat 20 may change, so the vibration component may be changed into a sound component. In this case, the alarm vibration may be changed into a sound, which then may propagate through the space and may be recognized as an alarm sound by a passenger other than the driver. For this reason, a sweep signal is generated by sweeping only a low frequency band of the sine wave. Thus, recognition of the alarm vibration as a sound by the passenger can be prevented.

Stored in the storage unit 2c is information (signal data) about eight signals 1 to 8 that is different in a combination of an initial frequency and a target frequency. FIG. 5 is a table showing the combinations of initial frequencies and target frequencies of the eight signals, 1 to 8, stored in the storage unit 2c. Note that the storage unit 2c may be disposed independently of the sweep signal generator 2.

The signal generators 2a are able to access the storage unit 2c and to read (extract) information about one of the signals 1 to 8 (signal data) shown in the table of FIG. 5 from the storage unit 2c. The signal generators 2a then determine the initial frequency and target frequency on the basis of the signal information read from the storage unit 2c. The signal generators 2a then generate sweep signals by smoothly changing the frequency of the sine wave in the frequency range from the determined initial frequency to target frequency.

Figure 4A:
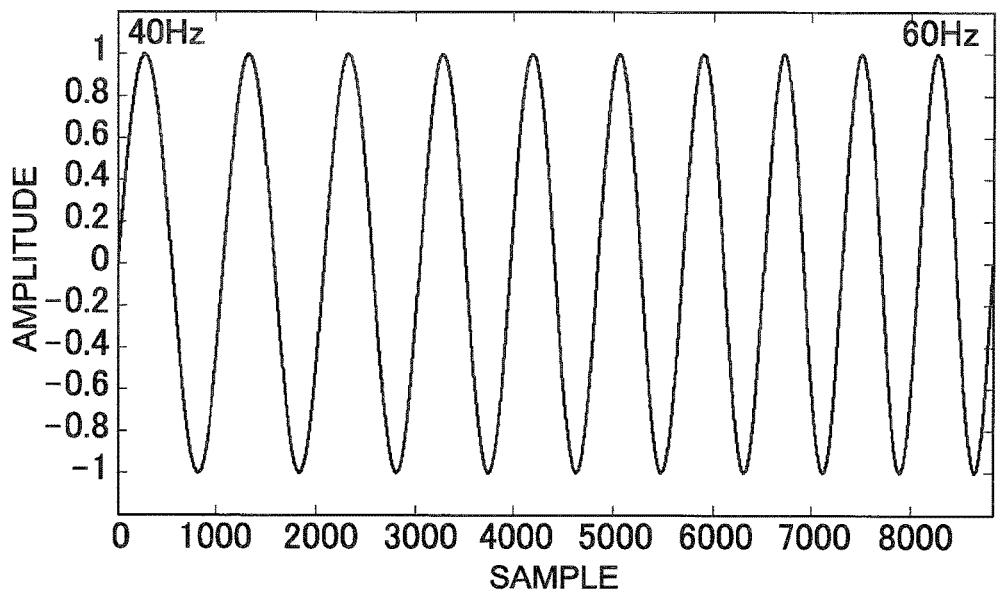
FIG. 4(a) is a diagram showing an example of amplitude characteristics of one cycle of a sweep signal generated by a signal generator according to the embodiment.

FIG. 4(a) is a diagram showing an example of amplitude characteristics of one cycle of a sweep signal generated by the signal generator 2a. More specifically, FIG. 4(a) shows one cycle of a sweep signal obtained by changing the frequency of the sine wave from an initial frequency of 40 Hz to a target frequency of 60 Hz (that is, one cycle of a sweep signal whose frequency band to be swept ranges from 40 Hz to 60 Hz).

One cycle of the sweep signal shown in FIG. 4(a) is 0.2 sec, and the sampling frequency thereof is 44.1 kHz. In this cycle, the frequency of the sweep signal is changed from 40 Hz to 60 Hz. Also, as shown in FIG. 4(a), the cycle of 0.2 sec of the sweep signal corresponds to 8,821 samples.

Figure 4B:
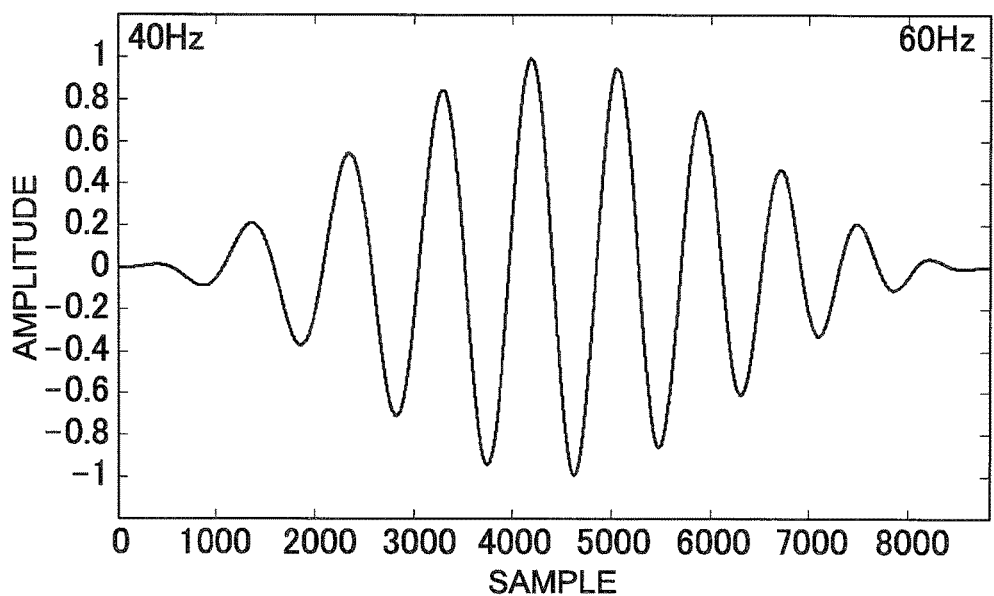
FIG. 4(b) is a diagram showing an example of amplitude characteristics of a sweep signal cycle obtained by weighting the sweep signal cycle shown in FIG. 4(a) using a Hann window.

The weighting unit 2b weights the sweep signals generated by the signal generators 2a. The weighting unit 2b according to the embodiment weights the sweep signals using a Hann window, which is an example window function. FIG. 4(b) shows amplitude characteristics of a sweep signal cycle obtained by weighting the cycle of the sweep signal shown in FIG. 4(a) using a Hann window. The weighting unit 2b need not perform weighting using a window function and may perform weighting using any method as long as the method allows for sufficient attenuation of the amplitude around the initial frequency of the sweep signal and the amplitude around the target frequency thereof. Also, a Hann window need not be used when performing weighting using a window function and another window function may be used.

As shown in FIG. 4(b), in the sweep signal cycle weighted by the weighting unit 2b, the amplitude around the initial frequency and the amplitude around the target frequency are converged, and the intermediate amplitude is amplified. That is, the weighted sweep signal cycle has amplitude characteristics where the amplitude value changes in accordance with changes in the frequency. In other words, the sweep signal cycle is controlled/deformed into a pulse-shaped signal due to the weighting of the amplitude value.

As seen above, the amplitude value of each cycle of a sweep signal can be changed by weighting. Thus, continuous input of signals having a uniform level (signal level, amplitude value) to the vibration devices such as the exciters EX1 to EX4 can be prevented while maintaining the feeling of vibration of the seat. As a result, continuous input of signals having a uniform level can be prevented from causing an overcurrent in the vibration devices and thus causing burn-out of the vibration devices.

Also, since the cycles of sweep signals can be controlled/deformed into pulse-shaped signals by the weighting process performed by the weighting unit 2b, the vibration devices can reduce the power consumption thereof compared to when outputting signals having a uniform level.

If signals having a particular frequency are outputted from the exciters EX1 to EX4 disposed in a particular member, such as a cushion member, in the seat, the vibrations can cause resonance. The signal frequency at which the resonance occurs is called "resonant frequency." The resonant frequency depends on the specific frequency of the member in which the exciters EX1 to EX4 are disposed. Even if low-level signals are outputted from the exciters EX1 to EX4, relatively large vibrations can be generated by resonance. For this reason, when giving an alarm to the driver through vibrations, signals having a resonant frequency are outputted from the exciters EX1 to EX4. Thus, the output of the amplifier 6 can be reduced, resulting in power savings.

However, the resonant frequency is characterized to change due to the individual differences between the vibration devices such as the exciters EX1 to EX4, variations in the properties of the material of the driver's seat 20, which transmits vibrations, the difference between the installation positions of the exciters EX1 to EX4, the aged deterioration of the exciters EX1 to EX4, the seat material, mounting members, or the like, or others. For this reason, the signal generators 2a use, as alarm signals (sweep signals), sine waves obtained by sweeping the frequency rather than using sinusoidal signals based on a single frequency. Thus, even if the resonant frequency changes, alarm signals can cause resonance.

The signal generators 2a can change the frequency range to be swept when generating sweep signals, by randomly changing the initial frequency and target frequency. For example, the four signal generators 2a-1 to 2a-4 independently randomly extract one of the signals 1 to 8 shown in FIG. 5 from the storage unit 2c and generate sweep signals on the basis of the initial frequencies and target frequencies of the extracted signals. The signals 1 to 8 are different in a combination of an initial frequency and a target frequency. By independently randomly extracting one of the signals 1 to 8 stored in the storage unit 2c, the signal generators 2a-1 to 2a-4 can generate sweep signals having different frequency ranges in which the frequency changes (frequency ranges to be swept).

Figure 6:
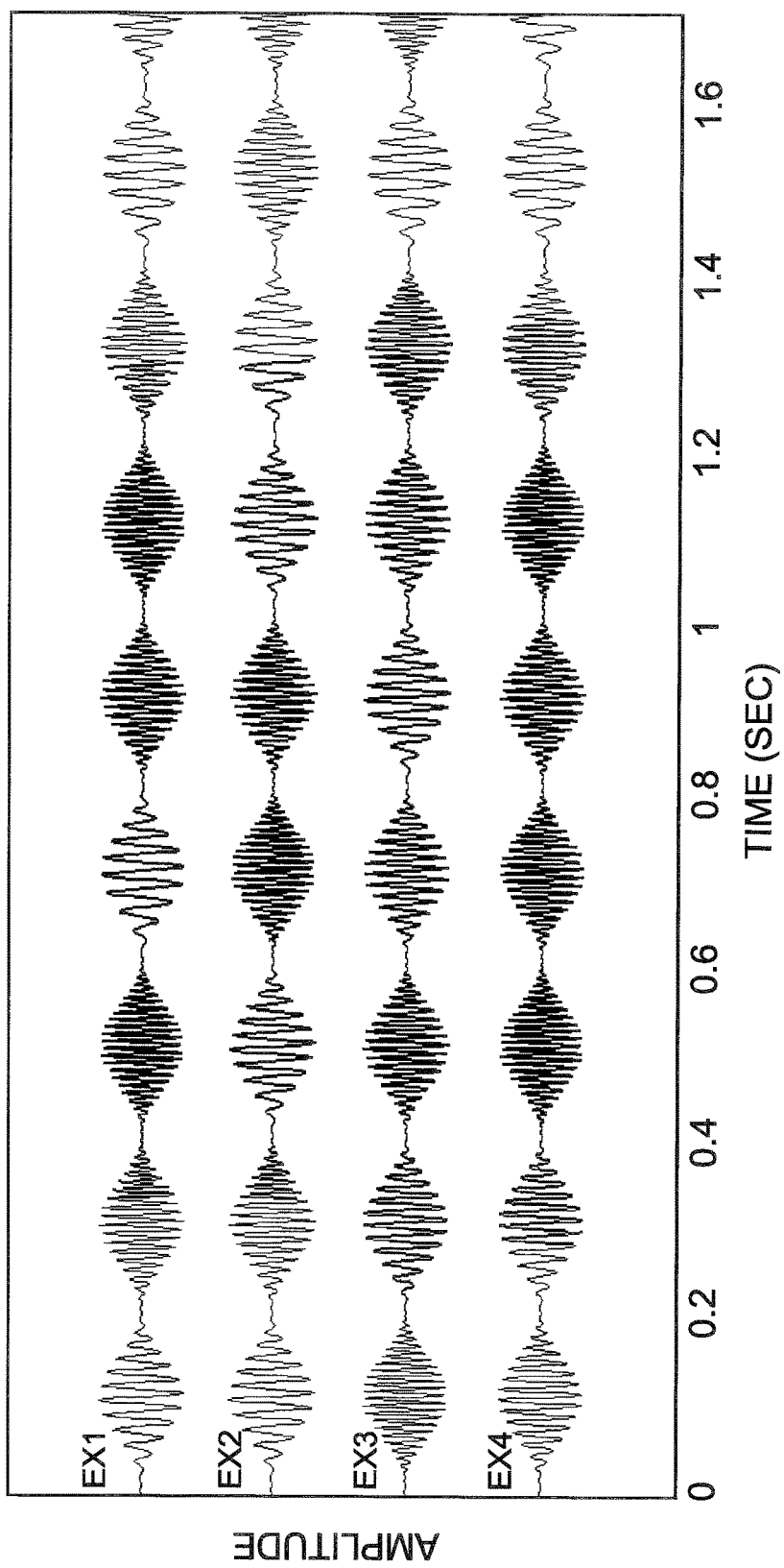
FIG. 6 is a diagram showing an example of output characteristics of sweep signals generated by randomly extracting one of the signals 1 to 8 shown in FIG. 5.

FIG. 6 shows output characteristics (amplitude characteristics) of sweep signals generated by the signal generators 2a-1 to 2a-4 by randomly extracting one of the signals 1 to 8 shown in the table of FIG. 5 and thus changing the combination of the initial frequency and target frequency. The signal generators 2a generate sweep signals corresponding to the exciters EX1 to EX4. FIG. 6 shows four sweep signals to be outputted from EX1 to EX4.

As shown in FIG. 6, the wavelength and frequency of each cycle (each pulse-shaped signal) of the sweep signals are changed by changing the initial frequency and target frequency. By changing the frequency ranges of the sweep signals in this manner, alarm vibrations having various frequency components can be outputted from the exciters disposed in the respective seat positions of the driver's seat 20.

In the embodiment, alarm vibrations having different frequency components are outputted from the exciters EX1 to EX4 disposed in four positions of the driver's seat 20. Thus, it is possible to improve the recognizability and distinguishability of alarm vibrations by the driver and to significantly increase the attention of the driver to vibrations.

In the example described above, each signal generator 2a generates a sweep signal as a signal having cycles of 0.2 sec (a signal corresponding to 8,821 samples). However, the cycle length of a sweep signal is not limited to this length. The four signal generators 2a, (2a-1 to 2a-4) according to the embodiment can independently randomly change the cycle length of a sweep signal.

The four sweep signals generated by the sweep signal generator 2 are outputted as a first sweep signal A, a first sweep signal B, a first sweep signal C, and a first sweep signal D to the generation frequency controller 3.

[Generation Frequency Controller]

The generation frequency controller 3 has a function of controlling the frequency with which alarm vibrations to be outputted from the exciters EX1 to EX4 are generated. As shown in FIG. 4(b), the sweep signal generator 2 generates the cycles of sweep signals into pulse-shaped signals on the basis of alarm information from the alarm information output unit 10 and continuously outputs the sweep signals to the generation frequency controller 3. Accordingly, if the generation frequency controller 3 does not control the frequency with which alarm vibrations are generated, pulse-shaped signals are continuously outputted from the exciters EX1 to EX4 and thus alarm vibrations are continuously generated.

On the other hand, if the generation frequency controller 3 controls the frequency with which alarm vibrations are generated, alarm vibrations are sometimes generated and sometimes not generated by the exciters EX1 to EX4. That is, the alarm vibration output pattern (occurrence pattern) can be changed by controlling the generation frequency. This can prevent the fixing of the alarm vibration output pattern, thereby preventing the driver from becoming insensitive to alarm vibrations.

Figure 7:
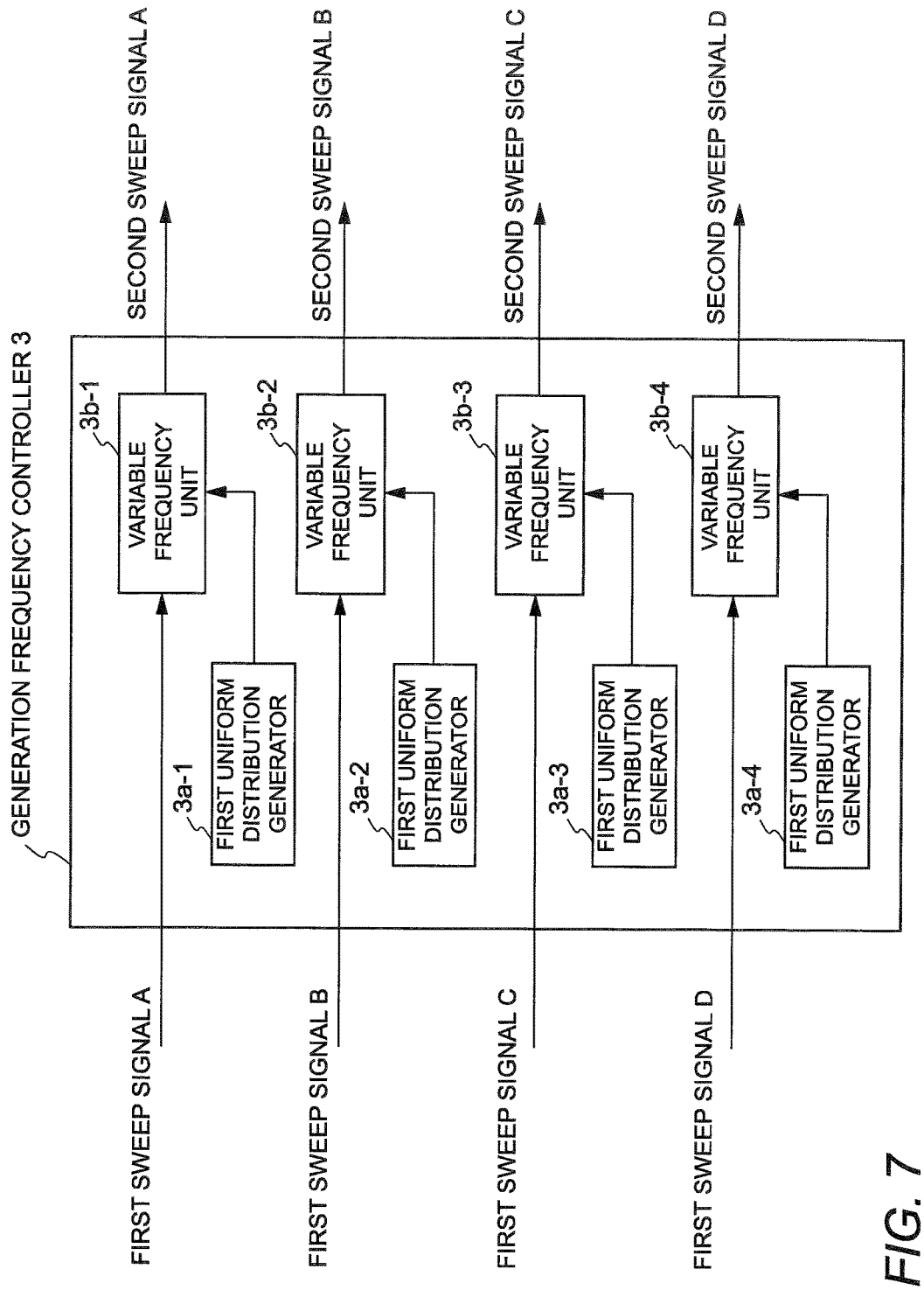
FIG. 7 is a block diagram showing a schematic configuration of a generation frequency controller according to the embodiment.

FIG. 7 is a block diagram showing a schematic configuration of the generation frequency controller 3. As shown in FIG. 7, the generation frequency controller 3 includes four first uniform distribution generators 3a (3a-1, 3a-2, 3a-3, and 3a-4) and four variable frequency units 3b (3b-1, 3b-2, 3b-3, and 3b-4). The four first uniform distribution generators 3a and four variable frequency units 3b are disposed so as to be associated with the exciters EX1 to EX4. The four variable frequency units 3b receive the first sweep signals A to D.

Each first uniform distribution generator 3a randomly extracts one value from a preset value range. If the extracted value is equal to or smaller than a preset threshold, the first uniform distribution generator 3a outputs a control signal to permit the output of an alarm vibration, to the corresponding variable frequency unit 3b. If the extracted value is greater than the predetermined threshold, the first uniform distribution generator 3a outputs a control signal to prohibit the output of an alarm vibration, to the variable frequency unit 3b.

Figure 8A:
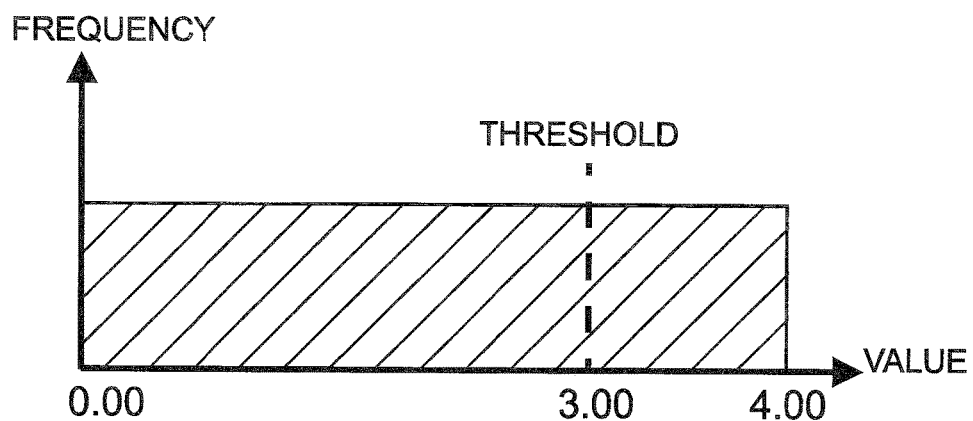
FIG. 8(a) is a diagram showing an example of output characteristics of a first uniform distribution generator of the embodiment.

FIG. 8(a) is a diagram showing an example of output characteristics of the first uniform distribution generator 3a. In FIG. 8(a), the preset value range is 0.00 to 4.00, and the threshold is set to 3.00. The "frequency" represented by the vertical axis of FIG. 8(a) means the ratio at which each value of 0.00 to 4.00 is extracted by the first uniform distribution generator 3a. FIG. 8(a) shows that any value is randomly extracted from the value range 0.00 to 4.00 at a uniform ratio. The output characteristics of the first uniform distribution generator 3a shown in FIG. 8(a) indicates that a "signal to permit output" is outputted as a control signal to the corresponding variable frequency unit 3b at a ratio of 3/4. The output characteristics also indicates that a "signal to prohibit output" is outputted as a control signal to the variable frequency unit 3b at a ratio of 1/4.

If the control signal received from the first uniform distribution generator 3a is a "signal to permit output," the variable frequency unit 3b outputs only one cycle (only one pulse-shaped signal) of the first sweep signal received from the sweep signal generator 2 to the generation level controller 4.

On the other hand, if the control signal is a "signal to prohibit output," the variable frequency unit 3b limits the amplitude of one cycle (one pulse-shaped signal) of the first sweep signal received from the sweep signal generator 2 to 0 (zero) and outputs the resulting first sweep signal to the generation level controller 4, or the variable frequency unit 3b blocks only one cycle (only one pulse-shaped signal) of the first sweep signal received from the sweep signal generator 2 so that the first sweep signal is not outputted to the generation level controller 4.

Figure 9:
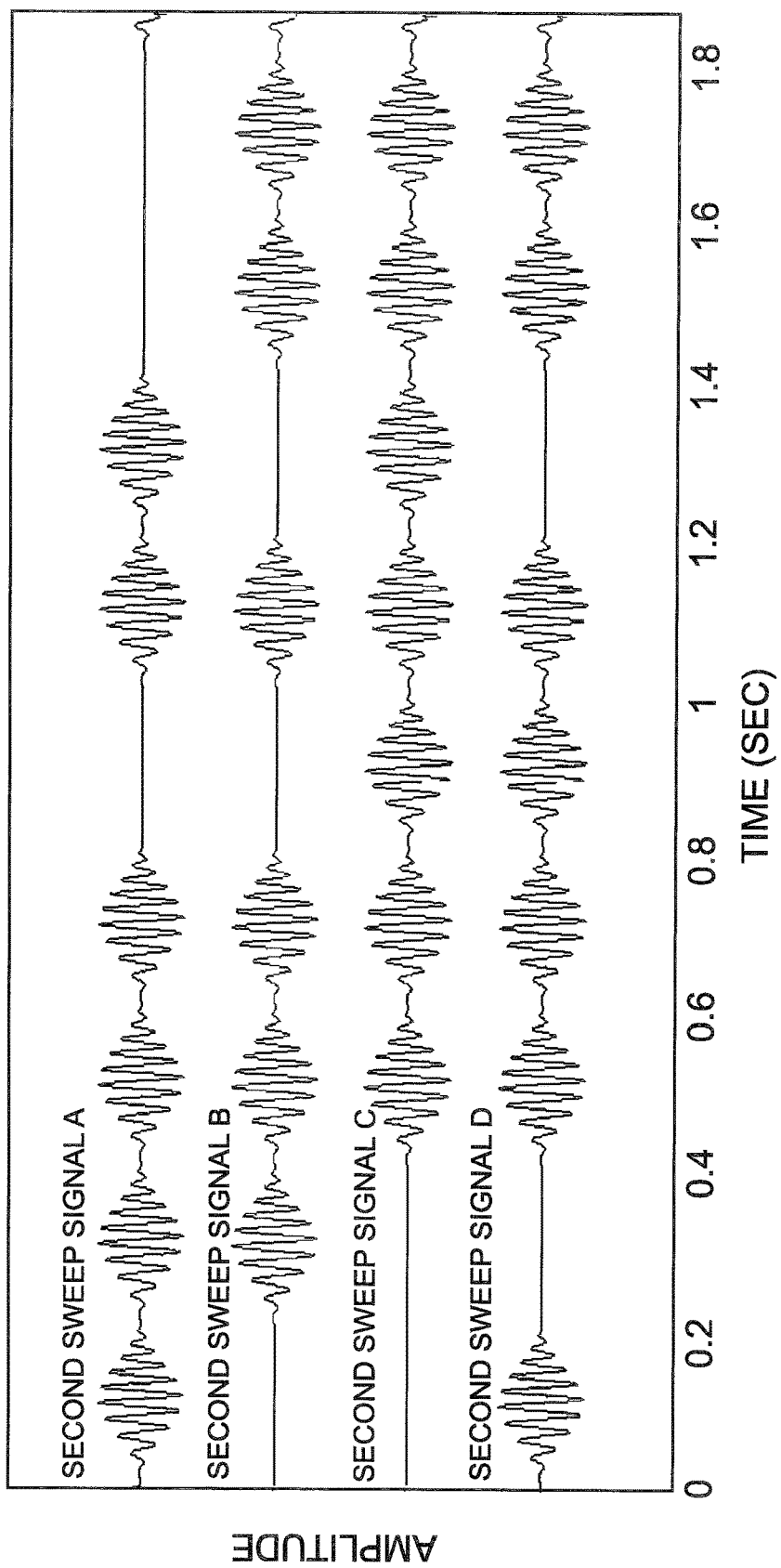
FIG. 9 is a diagram showing an example of output characteristics obtained by controlling the generation frequencies of pulse-shaped signals in sweep signals on the basis of the output characteristics of the first uniform distribution generator shown in FIG. 8(a).

FIG. 9 is a diagram showing output characteristics of signals obtained by controlling the generation frequencies of the pulse-shaped signals in the first sweep signals A to D whose initial frequencies are set to 40 Hz and whose target frequencies are set to 60 Hz, on the basis of output characteristics of the first uniform distribution generator 3a shown in FIG. 8(a). FIG. 9 shows that the pulse-shaped signals (0.2 sec-cycle weighted signals) in the sweep signals are outputted at random frequencies. The four sweep signals shown in FIG. 9 are defined as a second sweep signal A, a second sweep signal B, a second sweep signal C, and a second sweep signal D.

In FIGS. 8(a) and 9, the pulse-shaped signals (cycles) of the second sweep signals are outputted at the above ratio of 3/4. Accordingly, three cycles are averagely outputted with respect to pulse-shaped signals forming four cycles. The generation frequencies of the pulse-shaped signals in the second sweep signals can be changed by changing the threshold value shown in FIG. 8(a). For example, the generation frequency of pulse-shaped signals can be reduced by setting the threshold value to a smaller value. Thus, it is possible to set second sweep signals whose intervals between pulse-shaped signals are long and whose generation frequency of pulse-shaped signals is low.

The second sweep signals A to D are generated so as to correspond to the exciters EX1 to EX4. For this reason, the four first uniform distribution generators 3a and four variable frequency units 3b perform the generation frequency control process on the sweep signals to be inputted to the exciters EX1 to EX4. The generation frequencies and generation states of the pulse-shaped signals in the second sweep signals A to D shown in FIG. 9 are determined independently of each other without being influenced by each other.

The four second sweep signals A to D subjected to the pulse-shaped signal generation frequency control process by the generation frequency controller 3 are outputted to the generation level controller 4.

[Generation Level Controller]

Figure 10:
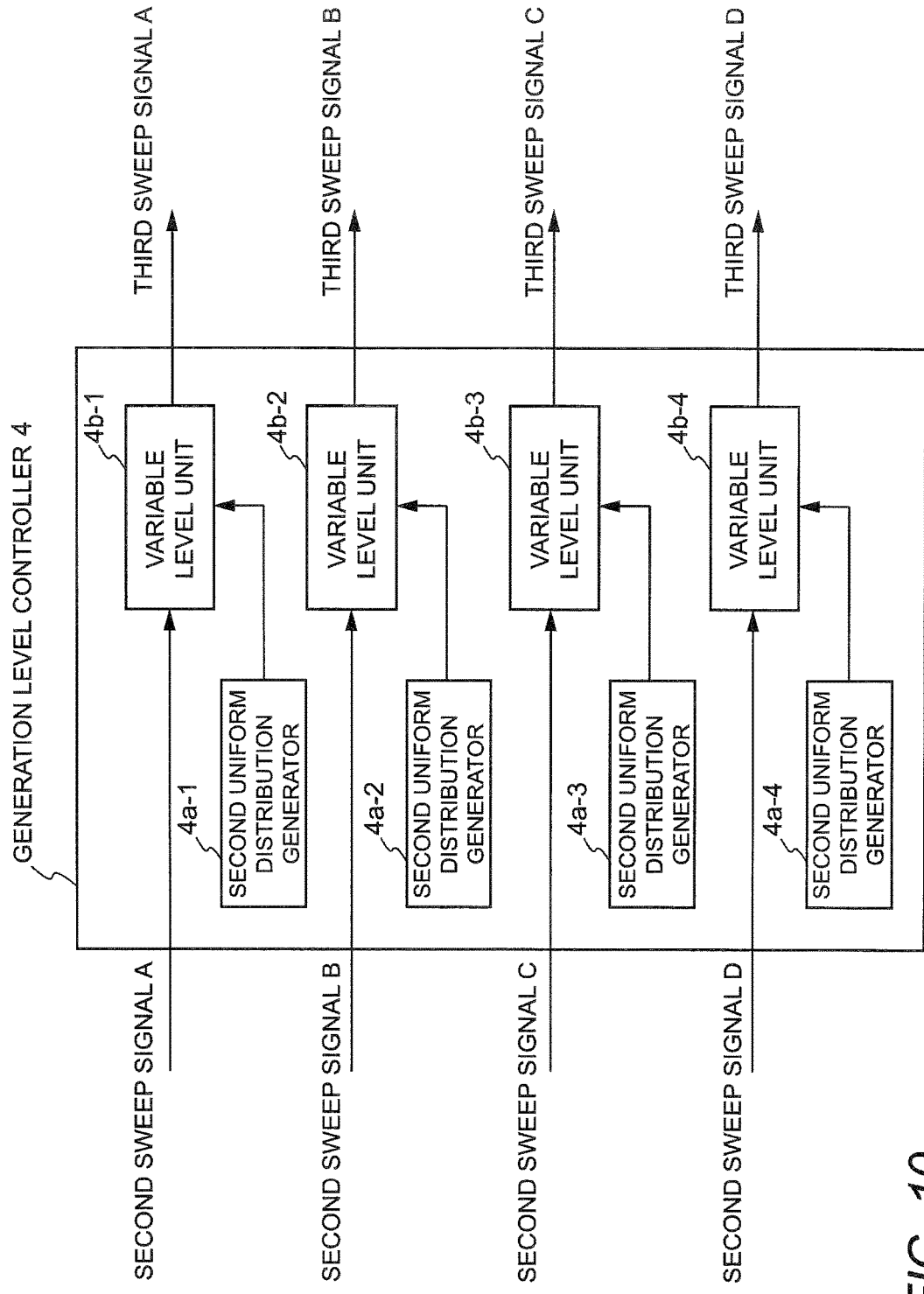
FIG. 10 is a block diagram showing a schematic configuration of a generation level controller according to the embodiment.

The generation level controller 4 has a function of controlling the levels of the sweep signals (second sweep signals A to D) subjected to the pulse-shaped signal generation frequency control process in each cycle by the generation frequency controller 3. FIG. 10 is a block diagram showing a schematic configuration of the generation level controller 4. As shown in FIG. 10, the generation level controller 4 includes four second uniform distribution generators 4a (4a-1, 4a-2, 4a-3, and 4a-4) and four variable level units 4b (4b-1, 4b-2, 4b-3, and 4b-4). The four first uniform distribution generators 4a and four variable level units 4b are disposed so as to be associated with the exciters EX1 to EX4. The four variable level units 4b receive the second sweep signals A to D.

Figure 8B:
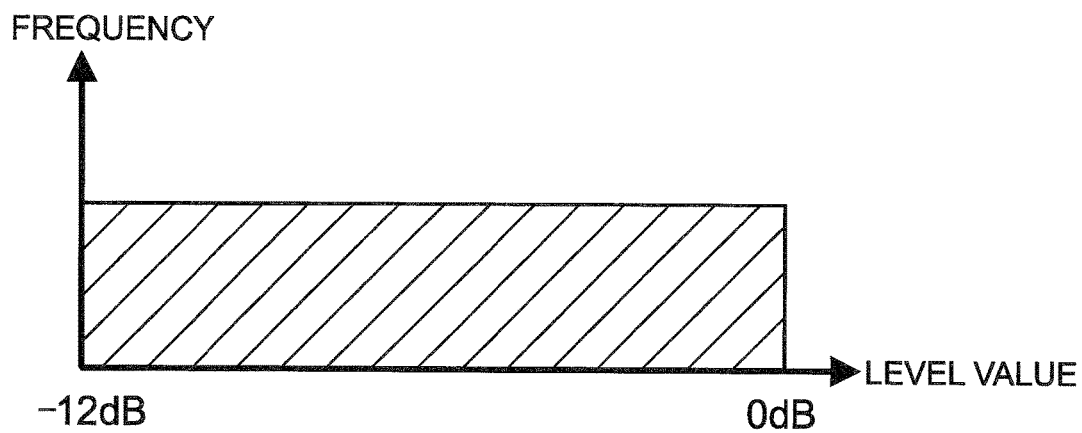
FIG. 8(b) is a diagram showing an example of output characteristics of a second uniform distribution generator of the embodiment.

Each second uniform distribution generator 4a randomly extracts one level value from a preset value range and outputs information about the extracted level value (level value information) to the corresponding variable level unit 4b. FIG. 8(b) is a diagram showing an example of output characteristics of the second uniform distribution generator 4a. In FIG. 8(b), the preset value range is −12 dB to 0 dB. The "frequency" represented by the vertical axis of FIG. 8(b) means the ratio at which each value of −12 dB to 0 dB is extracted by the second uniform distribution generator 4a.

FIG. 8(b) shows that a level value is randomly extracted from the value range of −12 dB to 0 dB at a uniform ratio.

The variable level units 4b control the signal levels of the cycles (pulse-shaped signals) of the second sweep signals A to D received from the generation frequency controller 3 on the basis of the level value information received from the second uniform distribution generators 4a and output the resulting signals to the generation delay controller 5. Specifically, the variable level units 4b determine the level values on the basis of the level value information acquired from the second uniform distribution generators 4a and convert the level values in decibel (dB) to those in linear (amplitude value). After linear-converting the level values, the variable level units 4b weight (control) the amplitude values of the cycles (pulse-shaped signals) of the second sweep signals A to D. The variable level units 4b-1 to 4b-4 independently weight the respective second sweep signals.

Figure 11:
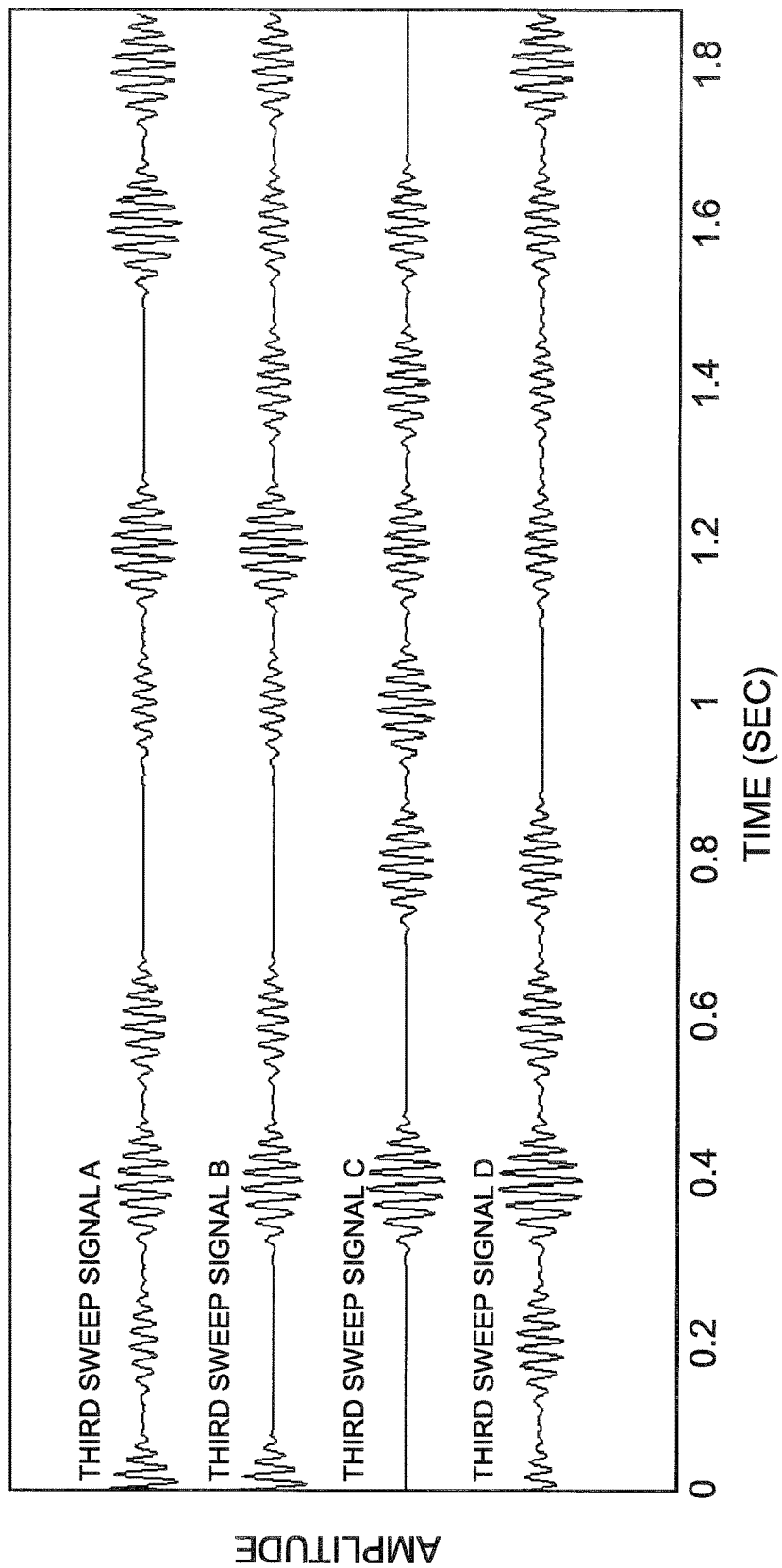
FIG. 11 is a diagram showing an example of output characteristics of sweep signals obtained by weighting the amplitude values (signal levels) of the sweep signals shown in FIG. 9 using the generation level controller according to the embodiment.

FIG. 11 is a diagram showing an example of output characteristics of four sweep signals obtained by the generation level controller 4 by weighting the amplitude values (signal levels) of the second sweep signals A to D subjected to the generation frequency control process by the generation frequency controller 3. The four sweep signals shown in FIG. 11 are defined as a third sweep signal A, a third sweep signal B, a third sweep signal C, and a third sweep signal D.

FIG. 11 shows that the amplitude values of the pulse-shaped signals (cycles) in the third sweep signals A to D have been randomly controlled/changed. Specifically, FIG. 11 shows that cycles (pulse-shaped signals) having smaller amplitude values have been weighted using smaller level values.

While FIG. 11 shows a case in which the level value range for weighting is −12 dB to 0 dB, the level value range is not limited to −12 dB to 0 dB. For example, if the level value range shown in FIG. 8(b) is expanded to −24 dB to 0 dB, the amplitude values (signal levels) of the weighted sweep signals (third sweep signals A to D) can be changed more greatly.

The third sweep signals A to D are generated so as to correspond to the exciters EX1 to EX4. For this reason, the four second uniform distribution generators 4a and four variable level units 4b weight the sweep signals to be inputted to the exciters EX1 to EX4. The amplitude values of the sweep signals (third sweep signals A to D) shown in FIG. 11 have been weighted independently of each other without being influenced by each other.

The four third sweep signals A to D subjected to the amplitude value (signal level) weighting process by the generation level controller 4 are outputted to the generation delay controller 5.

[Generation Delay Controller]

The generation delay controller 5 has a function of controlling the playback time positions of the sweep signals (third sweep signals) weighted by the generation level controller 4. Specifically, the generation delay controller 5 randomly changes the playback time positions of the third sweep signals A to D. To randomly change the playback time positions, the generation delay controller 5 continuously changes the timings when alarm vibrations are outputted from the exciters EX1 to EX4, on the basis of the four third sweep signals A to D.

Figure 12:
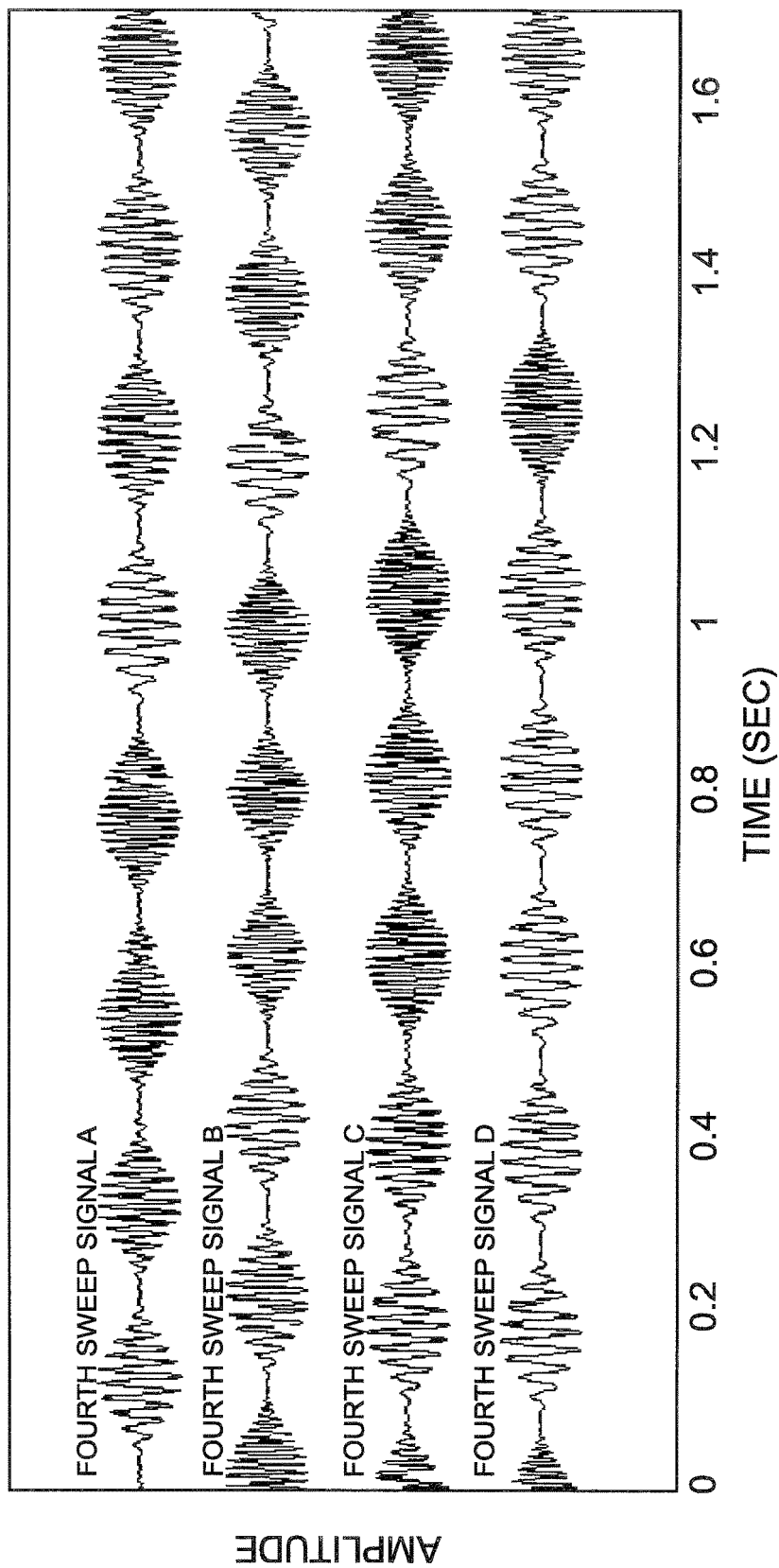
FIG. 12 is a diagram showing an example of output characteristics of signals obtained by randomly changing the playback time positions of the sweep signals shown in FIG. 6 using a generation delay controller according to the embodiment.

FIG. 12 is a diagram showing an example of output characteristics of signals whose playback time positions have been randomly changed by the generation delay controller 5. The sweep signals whose playback time positions have been controlled by the generation delay controller 5 are defined as a fourth sweep signal A, a fourth sweep signal B, a fourth sweep signal C, and a fourth sweep signal D.

FIG. 12 shows a state in which the playback time positions of the pulse-shaped signals (cycles) in the sweep signals are being changed independently of each other. By changing the playback time positions of the pulse-shaped signals in the fourth sweep signals A to D in this manner, alarm vibrations are outputted from the exciters EX1 to EX4 at various time intervals.

Figure 13:
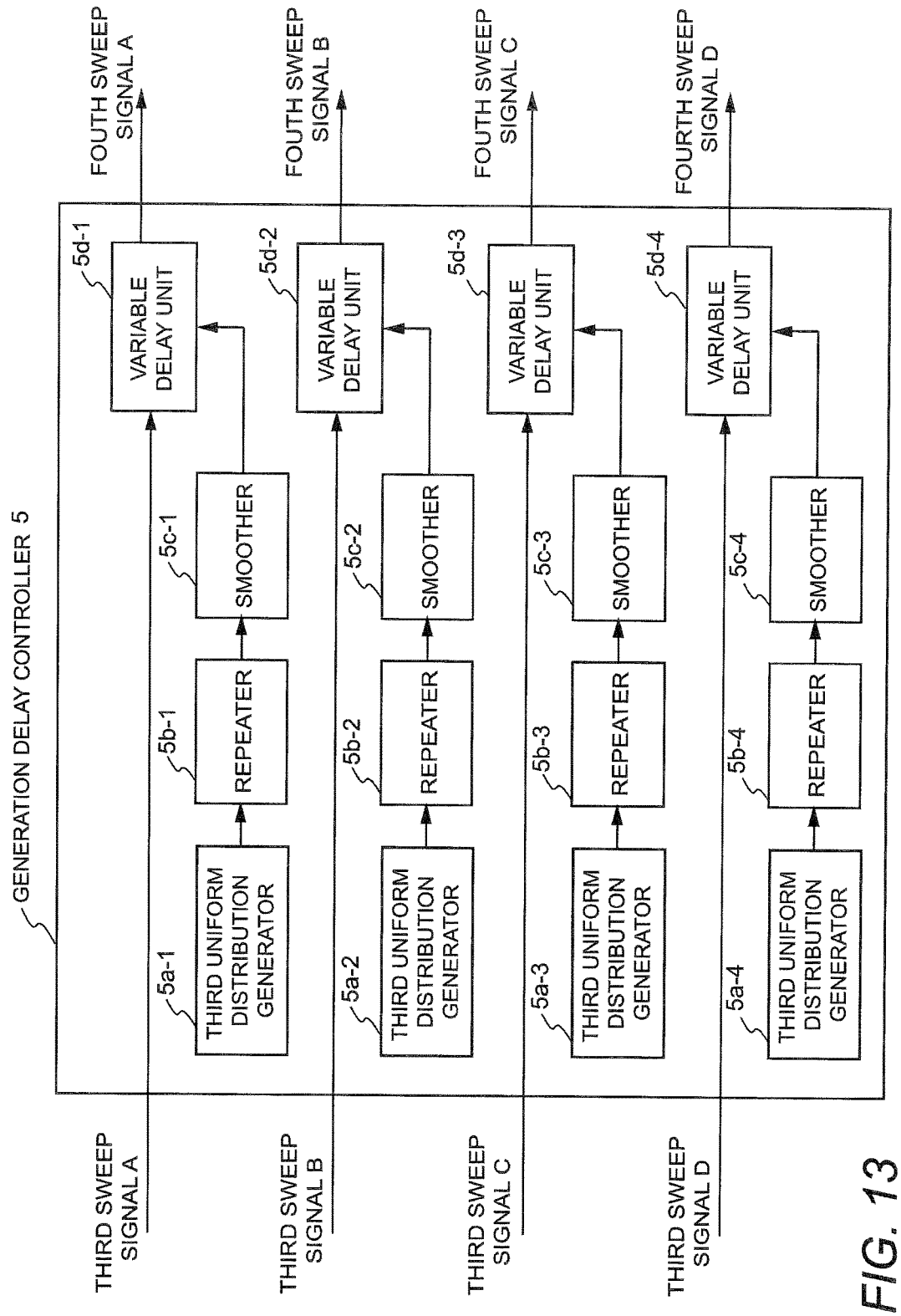
FIG. 13 is a block diagram showing a schematic configuration of the generation delay controller according to the embodiment.

FIG. 13 is a block diagram showing a schematic configuration of the generation delay controller 5. As shown in FIG. 13, the generation delay controller 5 includes four third uniform distribution generators 5a (5a-1, 5a-2, 5a-3, and 5a-4; delay signal generator), four repeaters 5b (5b-1, 5b-2, 5b-3, and 5b-4; delay signal generator), four smoothers 5c (5c-1, 5c-2, 5c-3, and 5c-4; delay signal generator), and four variable delay units 5d (5d-1, 5d-2, 5d-3, and 5d-4). The four third uniform distribution generators 5a, four repeaters 5b, four smoothers 5c, and four variable delay units 5d are disposed so as to be associated with the exciters EX1 to EX4. The four variable delay units 5d receive the third sweep signals A to D.

Each third uniform distribution generator 5a generates random signals (delay signals) by randomly extracting one time value as a delay time value from the time range of each cycle of the third sweep signal. In the embodiment, each third uniform distribution generator 5a generates delay signals by continuously randomly extracting a value from the time range of 0.0 sec to 0.2 sec of each cycle. The delay signals thus generated show the change states of the extracted time values (delay time values) in a time series.

Each repeater 5b prolongs the time by repeating the delay signals generated by the corresponding third uniform distribution generator 5a predetermined times. In the embodiment, each repeater 5b prolongs the time, for example, by eight cycles of the sweep signal. Each smoother 5c generates delay signals that change continuously and smoothly, by smoothing the signals whose time has been prolonged by the corresponding repeater 5b. In the embodiment, first-order Butterworth low-pass filters, for example, are used as the smoothers 5c, and the normalized cutoff frequency is set to 0.05.

Figure 14:
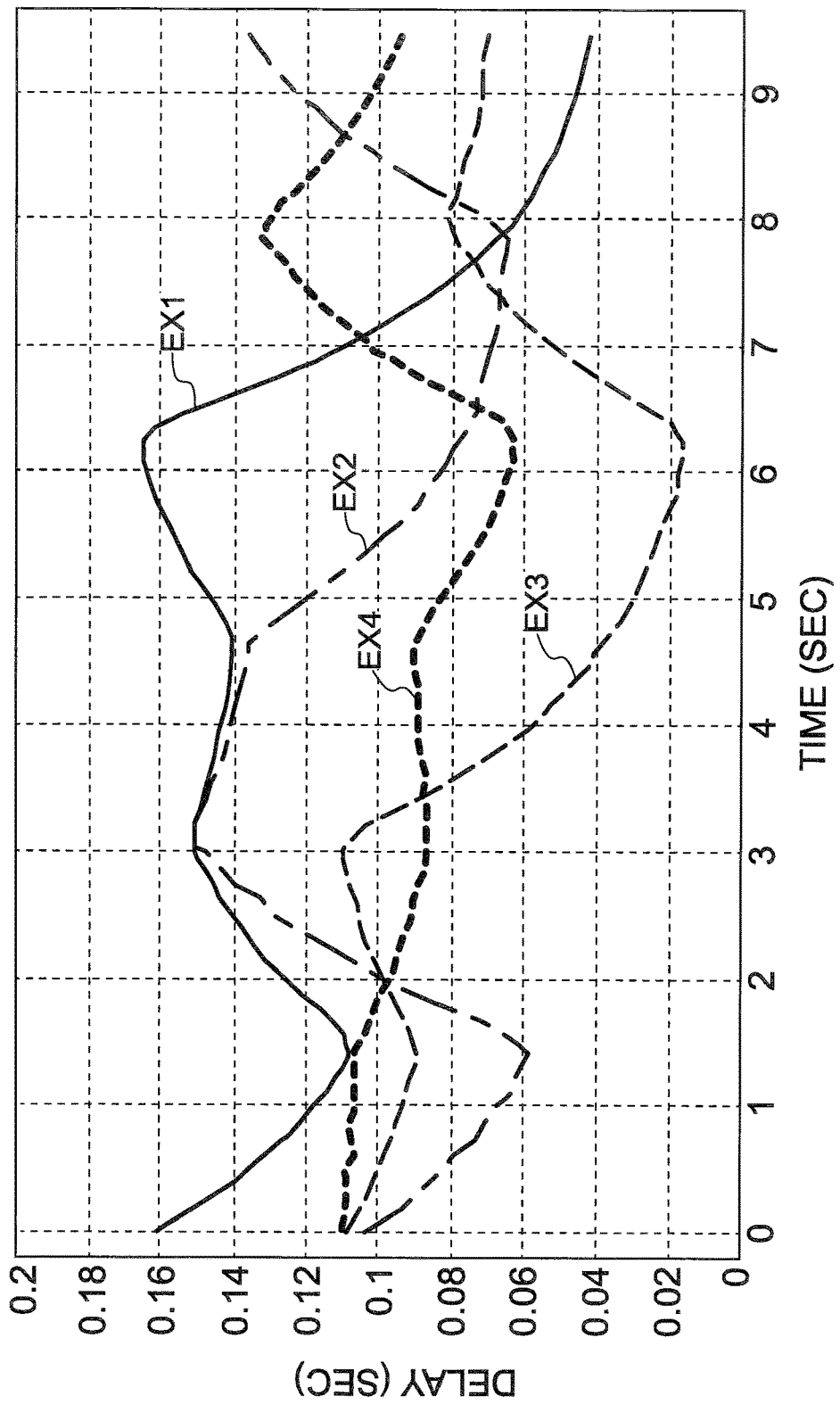
FIG. 14 is an example of a time-series graph showing delay time change states for performing a delay process using a variable delay unit according to the embodiment.

The variable delay units 5d receive the delay signals from the smoothers 5c and delay the third sweep signals A to D received from the generation level controller 4 on the basis of the change states of the delay signals. FIG. 14 is a time-series graph showing the change states of the delay times for delaying the third sweep signals using the variable delay units 5d on the basis of the delay signals outputted from the smoothers 5c to the variable delay units 5d. As shown in FIG. 14, the delay time continuously changes in a range of 0 sec to 0.2 sec. The delay signal generation process and delay process based on the third uniform distribution generators 5a, repeaters 5b, smoothers 5c, and variable delay units 5d are individually independently performed on the four third sweep signals A to D corresponding to the four exciters EX1 to EX4. For this reason, in the diagram of the change states of the delay times shown in FIG. 14, the change states of the delay times in the third sweep signals corresponding to the exciters EX1 to EX4 are independently shown in a time series.

The variable delay units 5d output, to the amplifier 6, the fourth sweep signals A to D (for example, see FIG. 12) obtained by independently controlling the playback time positions of the pulse-shaped signals (cycles) in the four third sweep signals.

[Amplifier]

The amplifier 6 amplifies the amplitude values (signal levels) of the four fourth sweep signals A to D received from the generation delay controller 5. The sweep signals whose amplitude values have been amplified by the amplifier 6 are outputted from the exciters EX1 to EX4 as alarm signals. By experiencing alarm vibrations outputted from the exciters EX1 to EX4 in the driver's seat 20, the driver can recognize whether an alarm is present or not.

As described above, the vehicle alarm device 1 according to the embodiment generates pulse-shaped signals using the sweep signal generator 2 and outputs the generated sweep signals from the exciters EX1 to EX4. Thus, vibrations can be outputted using resonance at the resonant frequency of the seat or the like.

In particular, the resonant frequency is characterized to change due to the individual differences between the exciters that generate vibrations, variations in the properties of the material of the driver's seat 20, which transmits vibrations, the difference between the installation positions of the exciters, the aged deterioration of the exciters, the seat material, mounting members, or the like, or others. For this reason, the sweep signal generator 2 uses, as alarm signals, sinusoidal signals obtained by sweeping the frequency rather than generating sinusoidal signals based on a single frequency. Thus, alarm vibrations can cause resonance even if the resonant frequency changes.

The sweep signal generator 2 stores multiple signals (signals 1 to 8) that are different in a combination of an initial frequency and a target frequency, in the storage unit 2c in advance and then generates sweep signals by randomly extracting one of the signals. By using the generated sweep signals as alarm signals, alarm vibrations having various frequency components can be outputted from the exciters EX1 to EX4 disposed in the driver's seat 20. Thus, the habituation of the driver to alarm vibrations can be suppressed. Also, the recognizability and distinguishability of alarm signals by the driver and the attention of the driver to alarm signals can be increased or maintained.

The generation frequency controller 3 randomly changes or controls the frequency with which pulse-shaped signals (the cycles of a sweep signal) are generated. Thus, alarm vibrations can be outputted from the exciters EX1 to EX4 disposed in the driver's seat 20 with various generation frequencies or output patterns. The generation level controller 4 randomly changes or controls the amplitude values of sweep signals. Thus, alarm vibrations having various vibration levels (amplitude values) can be outputted from the exciters EX1 to EX4 disposed in the driver's seat 20. As a result, it is possible to greatly reduce the possibility that alarm vibrations may be masked by a steady-state vehicle vibration that occurs depending on the road conditions during traveling.

Also, the sweep signal generator 2 generates sweep signals by randomly changing not only the generation frequency and vibration level but also the combination of the initial frequency and target frequency, or generates sweep signals by randomly changing the cycle. The generation delay controller 5 randomly changes the playback time positions of sweep signals. Thus, the influence of masking on alarm vibrations can be further reduced.

If alarm vibrations are constant, the driver would get used to the vibrations, losing his or her attention to the vibrations. In this case, the attention of the driver can be increased, recovered, or maintained by controlling the output of alarm vibrations of sweep signals using a random change in the generation frequency (output interval), a random change in the vibration level (amplitude value), or a random change in the frequency range of sweep signals, a random change in the playback time position, a random change in the cycles of sweep signals, or the like.

Also, continuous input of signals having a uniform level to the exciters EX1 to EX4 can be prevented by controlling the output of alarm vibrations of sweep signals using a random change in the generation frequency (output interval), a random change in the vibration level (amplitude value), a random change in the frequency range of sweep signals, a random change in the playback time position, a random change in the cycles of sweep signals, or the like. Thus, burn-out of the exciters EX1 to EX4 due to an overcurrent can be prevented.

Sweep signals to be outputted to the exciters EX1 to EX4 are independently changed or controlled with respect to the generation frequency, vibration level, playback time position, and the like by the sweep signal generator 2, generation frequency controller 3, generation level controller 4, and generation delay controller 5. Thus, the exciters generate alarm vibrations with different patterns. This can advantageously make the driver more likely to recognize or distinguish alarm vibrations, or, pay attention thereto even if the driver is driving a vehicle.

The vehicle notification device, vehicle notification method, and notification signals according to the present invention have been described in detail using the vehicle alarm device 1 as an example with reference to the drawings. However, the vehicle notification device, vehicle notification method, and notification signals according to the present invention are not limited to the example shown in the embodiment. It is apparent that those skilled in the art can conceive of various changes or modifications thereto without departing from the scope set forth in the claims. Such changes or modifications also can produce effects similar to those of the vehicle alarm device 1 according to the embodiment.

For example, FIG. 5 is illustrative only, and the frequency band of sweep signals generated by the sweep signal generator 2 is not necessarily limited to the combinations of initial frequencies and target frequencies shown in FIG. 5. Any other frequency range and any other initial frequency and target frequency may be used as long as signals in the frequency range can be outputted as vibrations from the exciters. Sweep signals need not necessarily be signals obtained by sweeping a sine wave and may be signals obtained by sweeping a wave having a different waveform.

In the above embodiment, the sweep signal generator 2 sets the target frequency of a sweep signal to a higher frequency value than the initial frequency thereof and changes (sweeps) the frequency of a sine wave from a low frequency to a high frequency at a constant speed. However, the frequency need not be changed (swept) from a low frequency to a high frequency and may be changed from a high frequency to a low frequency. The frequency may be changed in any direction as long as a feeling of transition based on changes in the frequency can be given to the driver.

Also, in the embodiment, the sweep signal generator 2 generates sweep signals on the basis of pulse-shaped signals (cycles) whose frequencies are changed from an initial frequency of 40 Hz to a target frequency of 60 Hz at constant speed. However, sweep signals need not necessarily be generated on the basis of pulse-shaped signals (cycles) whose frequencies are changed at constant speed. For example, sweep signals may be generated on the basis of pulse-shaped signals whose frequencies repeatedly increase and decrease rather than pulse-shaped signals whose frequencies increase and decrease at constant speed. By weighting such sweep signals using the weighting unit 2b, sweep signals may be generated. Also, a sweep signal may be generated by generating a pulse-shaped signal whose frequency is changed in multiple cycles and then weighting the pulse-shaped signal using the weighting unit 2b.

In the embodiment, the sweep signal generator 2 deforms a sweep signal into pulse-shaped signals whose amplitude is increased from a small amplitude in the first half and is converged in the second half, by performing weighting using a window function by the weighting unit 2b. This weighting process can prevent continuous input of signals having a uniform level to the exciters EX1 to EX4, thereby preventing burn-out of the exciters due to an overcurrent. However, a window function need not necessarily be used when deforming an alarm signal into a pulse-shaped signal.

Figure 15:
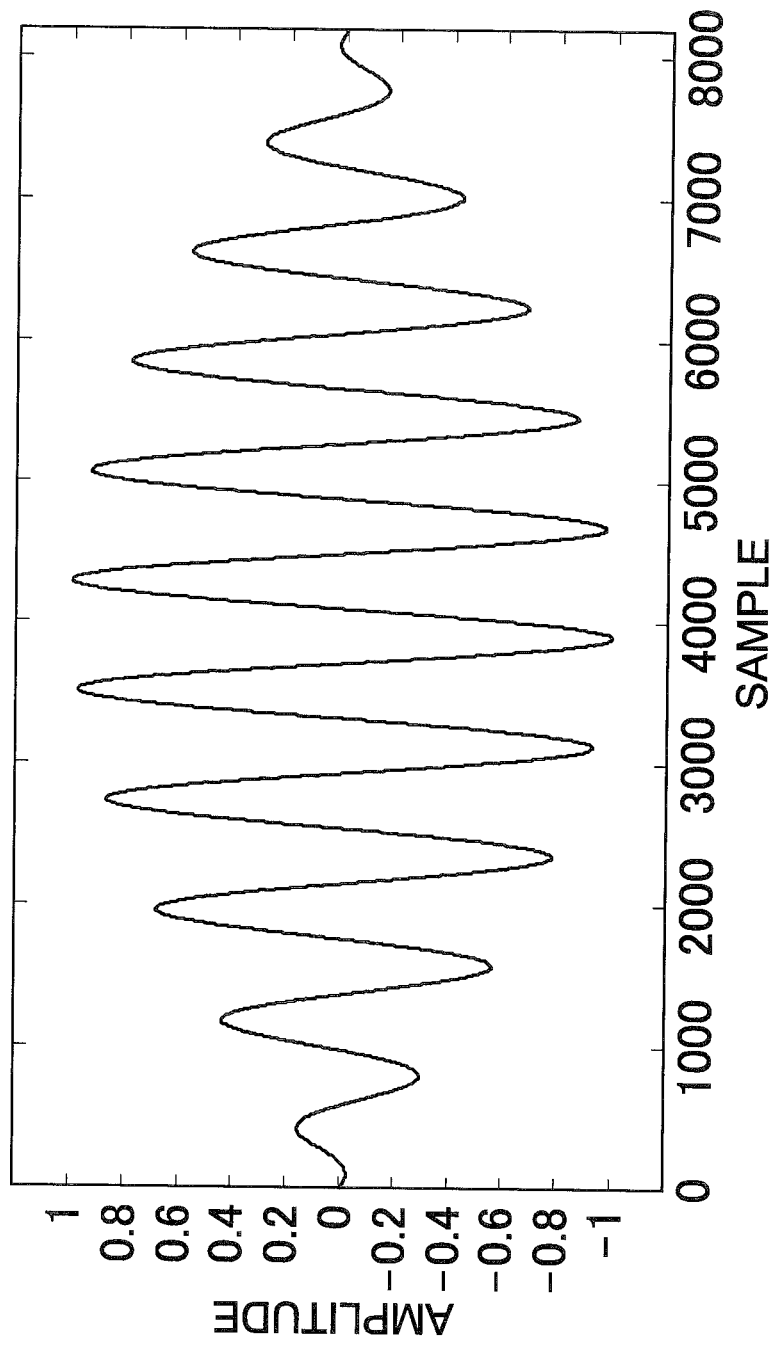
FIG. 15 is a diagram showing amplitude characteristics of a sinusoidal signal obtained by combining a sine wave having a frequency of 50 Hz and a sine wave having a frequency of 55 Hz.

For example, an amplitude-weighted signal may be generated by combining two sinusoidal signals having different frequencies. For example, by combining a sinusoidal signal having a frequency of 50 Hz and a sinusoidal signal having a frequency of 55 Hz, an amplitude value-weighted sinusoidal signal, as shown in FIG. 15, can be generated.

REFERENCE SIGNS LIST 1 vehicle alarm device (vehicle notification device)
2 sweep signal generator
2a signal generator
2b weighting unit
2c storage unit
3 generation frequency controller (occurrence frequency controller)
3a first uniform distribution generator
3b variable frequency unit
4 generation level controller (amplitude changer)
4a second uniform distribution generator
4b variable level unit
5 generation delay controller
5a third uniform distribution generator (delay signal generator)
5b repeater (delay signal generator)
5c smoother (delay signal generator)
5d variable delay unit
6 amplifier
10 alarm information output unit
20 driver's seat (seat)
21 seat surface
22 backrest
EX1 to EX4 exciter (vibrator)

The invention claimed is:

1. A vehicle notification device comprising:
a plurality of vibrators independently disposed in a seat;
a storage unit configured to store a plurality of pieces of signal data that are different in a combination of an initial frequency and a target frequency; and
a signal generator configured to randomly extract one of the pieces of signal data stored in the storage unit by the number of the vibrators and to generate a plurality of sweep signals corresponding to the number of the vibrators, each of the sweep signals being generated by changing a frequency from the initial frequency to the target frequency of the extracted piece of signal data in cycles, wherein
a plurality of notification vibrations whose frequencies change in different frequency ranges are outputted from a plurality of positions of the seat by outputting the sweep signals generated by the signal generator, individually from the vibrators.

2. The vehicle notification device according to claim 1, further comprising:
a delay signal generator configured to, by continuously randomly extracting one time value from a time range of each of the cycles as a delay time value, generate a plurality of delay signals indicating change states of the delay time values; and
a variable delay unit configured to delay the sweep signals generated by the signal generator in each of the cycles on the basis of the change states of the delay time values in the delay signals.

3. The vehicle notification device according to claim 1, further comprising at least one of:
an amplitude changer configured to randomly change amplitude values of the sweep signals generated by the signal generator in each of the cycles; and
an occurrence frequency controller configured to suppress occurrence of the notification vibrations in each of the cycles by randomly limiting the amplitude values of the sweep signals generated by the signal generator to zero in each of the cycles.

4. The vehicle notification device according to claim 1, wherein when changing frequencies of the sweep signals from the initial frequency to the target frequency, the signal generator changes amplitude values in accordance with changes in the frequencies.

5. A vehicle notification method performed by a vehicle notification device that outputs notification vibrations from a plurality of vibrators independently disposed in a seat, the method comprising:
a sweep signal generation step of randomly extracting, by a signal generator, one of a plurality of pieces of signal data stored in a storage unit by the number of the vibrators, the pieces of signal data being different in a combination of an initial frequency and a target frequency, and generating a plurality of sweep signals corresponding to the number of the vibrators, each of the sweep signals being generated by changing a frequency from the initial frequency to the target frequency of the extracted piece of signal data in cycles; and
a vibration output step of outputting a plurality of notification vibrations whose frequencies change in different frequency ranges, from a plurality of positions of the seat by outputting the sweep signals generated in the sweep signal generation step, individually from the vibrators.

6. The vehicle notification method according to claim 5, further comprising:
a delay signal generation step of, by continuously randomly extracting one time value from a time range of each of the cycles as a delay time value, generating, by a delay signal generator, a plurality of delay signals indicating change states of the delay time values; and
a variable delay step of delaying, by a variable delay unit, the sweep signals generated in the sweep signal generation step in each of the cycles on the basis of the change states of the delay time values in the delay signals generated in the delay signal generation step.

7. The vehicle notification method according to claim 5, further comprising at least one of:
an amplitude change step of randomly changing, by an amplitude changer, amplitude values of the sweep signals generated in the sweep signal generation step in each of the cycles; and an occurrence frequency control step of suppressing, by an occurrence frequency controller, occurrence of the notification vibrations in each of the cycles by randomly limiting the amplitude values of the sweep signals generated in the sweep signal generation step to zero in each of the cycles.

8. The vehicle notification method according to claim 5, wherein the sweep signal generation step comprises when changing frequencies of the sweep signals from the initial frequency to the target frequency, changing, by the signal generator, amplitude values in accordance with changes in the frequencies.

\* \* \* \* \*